United States Patent
Bergljung et al.

(10) Patent No.: US 9,722,761 B2
(45) Date of Patent: Aug. 1, 2017

(54) SECONDARY CELLS IN OVERLAPPING BANDS

(71) Applicant: Telefonaktiebolaget L M Ericsson (publ), Stockholm (SE)

(72) Inventors: Christian Bergljung, Lund (SE); Tao Cui, Upplands Väsby (SE); Yoshio Honda, Tokyo (JP); Klas Sjerling, Bromma (SE); Erika Tejedor, Stockholm (SE); Toshihito Kanai, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 204 days.

(21) Appl. No.: 14/510,755

(22) Filed: Oct. 9, 2014

(65) Prior Publication Data

US 2015/0098425 A1  Apr. 9, 2015

Related U.S. Application Data

(60) Provisional application No. 61/888,696, filed on Oct. 9, 2013.

(51) Int. Cl.
*H04W 72/04* (2009.01)
*H04L 5/14* (2006.01)
(Continued)

(52) U.S. Cl.
CPC .............. *H04L 5/14* (2013.01); *H04L 5/001* (2013.01); *H04L 5/0044* (2013.01); *H04L 5/0094* (2013.01); *H04W 72/00* (2013.01)

(58) Field of Classification Search
None
See application file for complete search history.

(56) References Cited

U.S. PATENT DOCUMENTS

2012/0058772 A1* 3/2012 Kazmi ............... H04W 72/048
455/450
2012/0202487 A1  8/2012 Kazmi et al.
(Continued)

OTHER PUBLICATIONS

Author Unknown, "3rd Generation Partnership Project; Technical Specification Group Radio Access Network; Evolved Universal Terrestrial Radio Access (E-UTRA); User Equipment (UE) radio transmission and reception (Release 12)," Technical Specification 36.101, Version 12.1.0. Sep. 2013, 3GPP Organizational Partners, 470 pages.

(Continued)

*Primary Examiner* — Rhonda Murphy
(74) *Attorney, Agent, or Firm* — Withrow & Terranova, PLLC (57) ABSTRACT

Systems and methods relating to configuring a Secondary Component Carrier (SCC) for a wireless device in a cellular communications network are disclosed. In some embodiments, the method comprises obtaining capabilities of the wireless device, where the capabilities indicate a frequency band combination supported by the wireless device. The frequency band combination supported by the wireless device includes a first frequency band supported by a base station and the wireless device used for a Primary Cell (PCell) of the wireless device and a second frequency band supported by the wireless device but not supported by the base station. The method further comprises identifying an overlap between the second frequency band supported by the wireless device but not supported by the base station and a third frequency band supported by the base station but not supported by the wireless device and configuring the SCC for the wireless device in the overlap.

20 Claims, 10 Drawing Sheets

(51) Int. Cl.
*H04L 5/00* (2006.01)
*H04W 72/00* (2009.01)

(56) References Cited

U.S. PATENT DOCUMENTS

| | | | | |
|---|---|---|---|---|
| 2013/0021980 A1* | 1/2013 | Yang | ............... | H04B 7/0626 |
| | | | | 370/328 |
| 2014/0302821 A1* | 10/2014 | Hwang | ............ | H04W 36/0055 |
| | | | | 455/411 |
| 2016/0112178 A1* | 4/2016 | Yi | ............ | H04W 16/32 |
| | | | | 370/280 |
| 2016/0127913 A1* | 5/2016 | Li | ............ | H04W 4/22 |
| | | | | 370/329 |

OTHER PUBLICATIONS

Author Unknown, "3rd Generation Partnership Project; Technical Specification Group Radio Access Network; Evolved Universal Terrestrial Radio Access (E-UTRA); Radio Resource Control (RRC); Protocol specification (Release 11)," Technical Specification 36.331, Version 11.5.0, Sep. 2013, 3GPP Organizational Partners, 347 pages.
Dahlman, Erik et al., "Spectrum and RF Characteristics," 4G: LTE/LTE-Advanced for Mobile Broadband, Academic Press, Oct. 7, 2013, pp. 431-471.
International Search Report and Written Opinion for PCT/IB2014/065220 mailed Dec. 17, 2014, 11 pages.

\* cited by examiner

SECONDARY CELLS IN OVERLAPPING BANDS

RELATED APPLICATIONS

This application claims the benefit of provisional patent application Ser. No. 61/888,696, filed Oct. 9, 2013, the disclosure of which is hereby incorporated herein by reference in its entirety.

FIELD OF THE DISCLOSURE

The present disclosure relates to carrier aggregation in a wireless network and, in particular, to secondary component carrier configuration.

BACKGROUND

Carrier aggregation is a feature of Evolved Universal Mobile Telecommunications System (UMTS) Universal Terrestrial Radio Access (E-UTRA) (Long Term Evolution (LTE)) by which it is possible to increase user throughput and cell capacity by aggregating carriers (radio channels) to increase the total bandwidth. Combining E-UTRA carriers of bandwidths between 1.4 and 20 Megahertz (MHz) within an operating band is referred to as intra-band carrier aggregation, whereas combining E-UTRA carriers in different operating bands is referred to as inter-band carrier aggregation. Combinations of intra- and inter-band aggregation are also possible. Currently, up to five carriers can be combined to generate an aggregate bandwidth of up to 100 MHz.

One component carrier in a combination of bands (i.e., a band combination) used for carrier aggregation with respect to a User Equipment (UE) acts a Primary Component Carrier (PCC) by which the UE performs initial connection establishment and handovers. One or more additional component carriers on other frequency carriers are designated as Secondary Component Carriers (SCCs) for the UE. Carrier aggregation can also be used in the downlink only. In this case, uplink transmissions from the UE occur over the PCC in one of the operating bands, while downlink transmissions to the UE occur simultaneously over the PCC as well as the SCC in different operating bands. In this scenario, there is no uplink transmission on the SCC.

There are currently 28 Frequency Division Duplex (FDD) and 8 Time Division Duplex (TDD) bands available for E-UTRA (LTE) networks. A combination of at least two carriers within an operating band or in different operating bands constitutes a band combination, and each carrier in combination is denoted as a component carrier. Thus, for inter-band carrier aggregation, there are many possible band combinations. Intra/inter-band carrier aggregation of at least two component carriers is also referred to as a band combination in the $3^{rd}$ Generation Partnership Program (3GPP) specifications, but in this disclosure it is sufficient to discuss inter-band carrier aggregation.

Each band combination of two or more component carriers uses a dedicated solution in the UE, and each UE can support a limited set of band combinations. The band combinations supported by the UE are indicated in UE capability information sent to a Base Station (BS) during a UE capability exchange between the BS and a corresponding Mobility Management Entity (MME) or between the BS and the UE. The UE capability exchange occurs when a connection between the BS and the UE is configured/established. Specifically, in this capability exchange, an indication is provided to the BS of which of the 28 FDD and 8 TDD bands are supported by the UE. The band combinations supported by the UE are then the combinations of the operating bands supported by the UE. The UE can support a finite set of operating bands and band combinations.

One problem that arises is that the ability to provide carrier aggregation to, e.g., increase throughput for a UE is limited by the finite set of band combinations that are supported by the UE. For instance, when the UE is roaming, the band combinations supported by the UE may not be supported by the network. As a result, even though the UE supports carrier aggregation, the network may be unable to provide carrier aggregation for the UE, since the network may not support the band combination(s) that are supported by the UE. Thus, there is a need for systems and methods for enabling carrier aggregation when a band combination of a UE is not supported by the network.

SUMMARY

Systems and methods relating to configuring a Secondary Component Carrier (SCC) for a wireless device in a cellular communications network are disclosed. In some embodiments, the method comprises obtaining capabilities of the wireless device, where the capabilities indicate a frequency band combination supported by the wireless device. The frequency band combination supported by the wireless device includes a first frequency band supported by a Base Station (BS) and the wireless device that is used for a Primary Cell (PCell) of the wireless device and a second frequency band supported by the wireless device but not supported by the BS. The method further comprises identifying an overlap between the second frequency band supported by the wireless device but not supported by the BS and a third frequency band supported by the BS but not supported by the wireless device and configuring the SCC for the wireless device in the overlap. In this manner, the SCC carrier for the wireless device can be configured in the overlap between two different frequency bands supported by the BS and the wireless device.

In some embodiments, configuring the SCC in the overlap comprises indicating, to the wireless device, an Evolved Universal Terrestrial Radio Access (E-UTRA) Absolute Radio Frequency Channel Number (EARFCN) of the second frequency band supported by the wireless device but not supported by the BS. Further, in some embodiments, the second frequency band supported by the wireless device but not supported by the BS is a downlink only frequency band, and the third frequency band supported by the BS but not supported by the wireless device is a Frequency Division Duplex (FDD) frequency band. In other embodiments, the second frequency band supported by the wireless device but not supported by the BS is a first FDD frequency band, and the third frequency band supported by the BS but not supported by the wireless device is a second FDD frequency band. In other embodiments, the second frequency band supported by the wireless device but not supported by the BS is a FDD frequency band, and the third frequency band supported by the BS but not supported by the wireless device is a Time Division Duplex (TDD) frequency band. In other embodiments, the second frequency band supported by the wireless device but not supported by the BS is a TDD frequency band, and the third frequency band supported by the BS but not supported by the wireless device is a FDD frequency band.

Embodiments of a BS enabled to configure a SCC for a wireless device in a cellular communications network enabling carrier aggregation are also disclosed. In some embodiments, the BS comprises a wireless transceiver, at least one processor, and memory containing instructions executable by the at least one processor, whereby the BS is configured to obtain capabilities of the wireless device, where the capabilities indicate a frequency band combination supported by the wireless device that includes a first frequency band supported by the BS and the wireless device that is used for a PCell of the wireless device and a second frequency band supported by the wireless device but not supported by the BS. The BS identifies an overlap between the second frequency band supported by the wireless device but not supported by the BS and a third frequency band supported by the BS but not supported by the wireless device and configures the SCC for the wireless device in the overlap.

In some embodiments, in order to configure the SCC in the overlap, the BS is operative to indicate, to the wireless device, an EARFCN of the second frequency band supported by the wireless device but not supported by the BS. Further, in some embodiments, the second frequency band supported by the wireless device but not supported by the BS is a downlink only frequency band, and the third frequency band supported by the BS but not supported by the wireless device is a FDD frequency band. In other embodiments, the second frequency band supported by the wireless device but not supported by the BS is a first FDD frequency band, and the third frequency band supported by the BS but not supported by the wireless device is a second FDD frequency band. In other embodiments, the second frequency band supported by the wireless device but not supported by the BS is a FDD frequency band, and the third frequency band supported by the BS but not supported by the wireless device is a TDD frequency band. In other embodiments, the second frequency band supported by the wireless device but not supported by the BS is a TDD frequency band, and the third frequency band supported by the BS but not supported by the wireless device is a FDD frequency band.

Those skilled in the art will appreciate the scope of the present disclosure and realize additional aspects thereof after reading the following detailed description of the embodiments in association with the accompanying drawing figures.

BRIEF DESCRIPTION OF THE DRAWING FIGURES

The accompanying drawing figures incorporated in and forming a part of this specification illustrate several aspects of the disclosure, and together with the description serve to explain the principles of the disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

Carrier aggregation is a feature of Evolved Universal Mobile Telecommunications System (UMTS) Universal Terrestrial Radio Access (E-UTRA) (Long Term Evolution (LTE)) by which it is possible to increase user throughput and cell capacity by aggregating carriers (radio channels) to increase the total bandwidth. Currently, there are currently 28 Frequency Division Duplex (FDD) and 8 Time Division Duplex (TDD) bands available for E-UTRA (LTE) networks. A combination of at least two carriers within an operating band or in different operating bands constitutes a band combination, and each carrier in combination is denoted a component carrier. Thus, for inter-band carrier aggregation, there are many possible band combinations. Intra/inter-band carrier aggregation of at least two component carriers is also referred to as a band combination in the $3^{rd}$ Generation Partnership Project (3GPP) specifications, but in this disclosure it is sufficient to discuss inter-band carrier aggregation.

Each band combination of two or more component carriers supported by a User Equipment (UE) uses a dedicated solution in the UE. Each UE can support a limited set of band combinations. The band combinations supported by a UE are indicated in UE capability information sent to a Base Station (BS) during a UE capability exchange. The UE capability exchange may be between the BS and a corresponding Mobility Management Entity (MME) or between the BS and the UE. The UE capability exchange occurs when a connection between the BS and the UE is configured or established. Specifically, in this capability exchange, an indication is provided to the BS as to which of the available 28 FDD and 8 TDD bands are supported by the UE. The band combinations supported by the UE are then the combinations of the operating bands supported by the UE. The UE can support a finite set of operating bands and band combinations.

Figure 1:
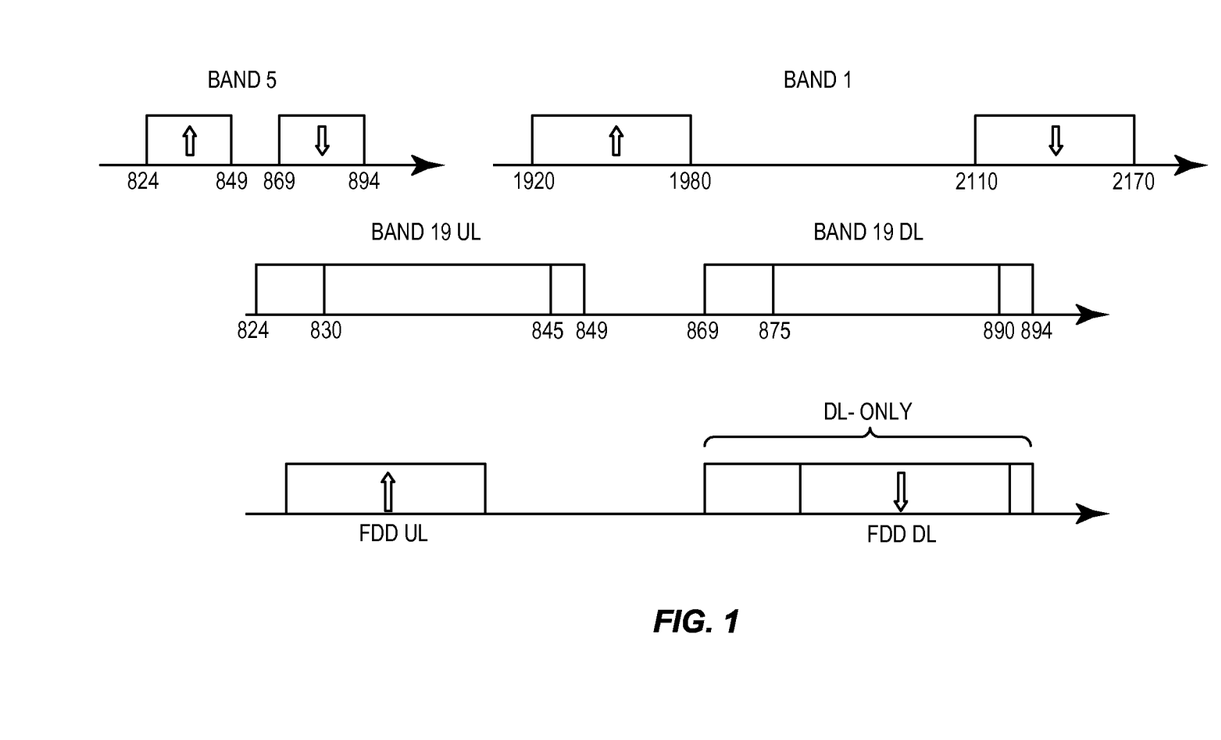
FIG. 1 illustrates examples of overlapping frequency bands supported by a wireless network and a wireless device (e.g., a User Equipment (UE)) according to some embodiments of the present disclosure.

Operating bands in different regions are sometimes overlapping or partly overlapping. FIG. 1 illustrates FDD band 19, which is used in Japan, and FDD band 5. FDD band 19 includes an uplink band of 830-845 Megahertz (MHz) and a downlink band of 875-890 MHz. FDD Band 5 includes an uplink band of 824-849 MHz and a downlink band of 869-894 MHz. Band 1 with the range 1920-1980 MHz (uplink)/2110-2170 MHz (downlink) is also available in Japan. As illustrated in FIG. 1, FDD band 5 and FDD band 19 partly overlap. Specifically, the uplink band of FDD band 19 falls within the uplink band of FDD band 5, and the downlink band of FDD band 19 falls within the downlink band of FDD band 5. However, using conventional approaches, it is not possible to use a UE supporting the FDD band 1 and FDD band 5 combination in a network configured with the FDD band 1 and FDD band 19 combination, unless the FDD band 19 BS supports multi-band signaling such that both FDD band 19 and FDD band 5 can be indicated in the FDD band 19 cell.

Bands that are only intended as downlink-only bands in some regions may also be overlapping with FDD bands in another region, as also illustrated in FIG. 1. Specifically, FIG. 1 illustrates a downlink-only band that overlaps a downlink band of an FDD band. A UE supporting the downlink-only band cannot establish a connection on the FDD band if the UE does not support the FDD band. However, the downlink-only band could potentially be used as a Secondary Component Carrier (SCC) (without uplink) in the part overlapping with the FDD downlink, but the FDD BS would not indicate the downlink-only band in its system information if the full frequency range of the downlink-only band is not supported.

For carrier aggregation, a Primary Cell (PCell) for a UE is operated on a Primary Component Carrier (PCC), on which the UE performs connection establishment and handover. Secondary Cells (SCell) are operated on SCCs in another operating band (for inter-band carrier aggregation) and can be configured once the connection is established in the PCell. The carrier (center) frequencies of the component carriers are identified by corresponding E-UTRA Absolute Radio Frequency Channel Numbers (EARFCNs). Each EARFCN is unique for an operating band with its band number. Overlapping bands have different band numbers, which means that one and the same frequency (Hertz (Hz)) in the overlap is identified by several EARFCNs, unique for each band number.

In the PCell, the band number of the operating band is indicated by the Frequency Band Indicator (FBI) in the system information for the PCell such that the UE can derive the downlink EARFCN during the initial connection establishment. This information is understood by the UE if it supports the particular operating band. For overlapping bands, the BS can provide several FBI(s) in a cell such that a UE can attach if at least one of the FBI(s) is supported and the EARFCN corresponding to that FBI can be derived. During the connection establishment, the UE capabilities are provided so that the BS is aware of the operating bands and the band combinations supported by the UE.

SCells are configured for a UE by sending the EARFCN of the SCC in information dedicated to each UE based on the UE capability sent on the PCell. The FBI is not sent during configuration of the SCell(s). In certain instances (i.e., in some embodiments), a UE may be located in a region where, e.g., the downlink part of an FDD band overlaps with a downlink-only band intended for use in another region, as shown in FIG. 1. If this FDD band is supported by the UE, a connection can be established on this band or the UE be configured for inter-band carrier aggregation if a band combination with another operating band is also supported.

If the FDD band is not supported by the UE but the downlink-only band supported by the UE overlaps the FDD band, then the FDD band supported by the network can still be used for a SCC for the UE by the following resolution. The BS equipped with (i.e., that supports) the FDD band configures an EARFCN for the SCC of the UE that corresponds to the downlink-only band supported by the UE (i.e., can be identified by the UE) rather than to the FDD band supported by the BS. However, the EARFCN, or in other words the SCC, is confined to the overlap between the downlink-only band supported by the UE and the downlink of FDD band supported by the BS. Hence, a subset of the EARFCN for the downlink-only band is used by the BS. The BS is able to send the EARFCN of the downlink-only band even if the full range of this downlink-only band is not supported by the BS. The connection with the UE is established on the PCell (i.e., must be supported by the UE) in another frequency band.

Note that the relationship between the EARFCN and the carrier frequency in the uplink and downlink is defined in 3GPP TS 36.101. Specifically, as defined in 3GPP TS 36.101, the carrier frequency in the uplink and downlink is designated by the EARFCN in the range 0-65535. The relation between the EARFCN and the carrier frequency in MHz for the downlink is given by the following equation, where $F_{DL\_low}$ and $N_{Offs\text{-}DL}$ are given in Table 5.7.3-1 and $N_{DL}$ is the downlink EARFCN.

$$F_{DL}=F_{DL\_low}+0.1(N_{DL}-N_{Offs\text{-}DL})$$

The relation between the EARFCN and the carrier frequency in MHz for the uplink is given by the following equation where $F_{UL\_low}$ and $N_{Offs\text{-}UL}$ are given in Table 5.7.3-1 and $N_{UL}$ is the uplink EARFCN.

$$F_{UL}=F_{UL\_low}+0.1(N_{UL}-N_{Offs\text{-}UL})$$

The EARFCN used to configure the SCC of the UE is the EARFCN that corresponds to the downlink only frequency band supported by the UE. Thus, as discussed below, in some embodiments, the EARFCN is communicated to the UE in an RRCConnectionReconfiguration message to thereby configure the SCC of the UE. Note, however, that only the overlap will actually be used for the actual SCC configuration. The UE supports the downlink-only band and, as such, is capable to set up the SCC upon receiving the EARFCN for the downlink-only band. Note that this discussion of the EARFCN used to configure the SCC is equally applicable to the other examples and embodiments described herein.

The UE can also be configured by the BS to perform measurements on the frequency of the SCC. The BS can then use the EARFCN for the downlink-only band (again confined to the overlap between the downlink-only band and the downlink of the FDD band), which is supported by the UE.

In some embodiments, a SCC for a UE can be configured in an overlap between a downlink-only band and a downlink of a particular FDD band even if the FDD band is not supported by the UE. The connection is established on a PCell supported in an additional frequency band that is supported by the UE. The network also supports the particular FDD band but not the full range of the downlink-only band. In the subsequent UE capability exchange on the PCell, the UE indicates support of the band combination of the band supporting the PCell and the downlink-only band, but support of the particular FDD band above is not indicated. When configuring the SCC, a BS supporting the particular FDD band indicates, in an RRCConnectionReconfiguration message, an EARFCN of the downlink-only band supported by the UE that corresponds to the overlap with the downlink of the FDD band supported by the network/BS. The UE can then use both the PCell (which uses the PCC) and an SCell (which uses the SCC) for transferring data in the downlink. Uplink data transfer occurs on the PCell only. When the E-UTRA Network (E-UTRAN) configures UE measurements on the SCC, the EARFCN of the downlink-only band supported by the UE that corresponds to the overlap with the downlink of the FDD band that is supported by the network is used.

In some embodiments, a SCC can be configured for a UE in the overlap between two overlapping FDD bands if the UE indicates on a PCell of the UE support of a band combination that includes at least one of these FDD bands. The UE need not support the so-called MultiBandInfoList that allows the UE to establish connection in case the FBI(s) for the overlapping bands are signaled on the SCell by the network. When configuring the SCC, the BS indicates in the RRCConnectionReconfiguration message the EARFCN of the FDD band included in the supported band combination (i.e., the EARFCN of the FDD band supported by the UE). The UE can then use both the PCell (which uses the PCC) and an SCell (which uses the SCC) for transferring data in the downlink. Uplink data transfer can always occur on the PCell. Uplink data transfer may not be able to be supported on the SCell if UE transmissions on the SCell are not allowed in the overlap for the FDD band supported by the UE. Consider, for example, the scenario in FIG. 1 and a UE roaming in a network supporting FDD band 1 and FDD band 19 and that the UE supports FDD band 1, FDD band 5, and the band combination FDD band 1+FDD band 5, but not FDD band 19. The PCell is then configured in FDD band 1 (for connection establishment and handover), while the SCC is configured in the overlap by using the EARFCN of FDD band 5 in the RRCConnectionReconfiguration message sent to the UE by the BS supporting FDD band 19. Transfer of data can then occur on both the PCell and the SCell in the downlink direction. This is possible even if the MultiBandInfoList is not supported; this would have allowed the UE to decode the EARFCN of FDD band 19 in addition even if FDD band 19 is not indicated in the UE capability. Uplink UE transmissions in the overlap between FDD band 5 and FDD band 19 may be possible on the SCell if the operator allows this (i.e., can be prevented in similar cases due to, e.g., regulatory requirements). When the E-UTRAN configures UE measurements on the SCell, the EARFCN of FDD band 5 that corresponds to the overlap with FDD band 19 is used.

In a third embodiment, a SCC can be configured in the overlap between a downlink of an FDD band and a TDD band if the UE indicates on the PCell support of a band combination that includes at least one of these bands (e.g., the TDD band). The TDD band is then only used for the downlink transmissions on the SCell. When configuring the SCell, the BS indicates in the RRCConnectionReconfiguration message the EARFCN of the TDD band included in the supported band combination.

One or more advantages are readily apparent from the disclosure. For example, in some instances, the features described in this disclosure can account for overlapping uplink and downlink bands in carrier aggregation.

Figure 2:
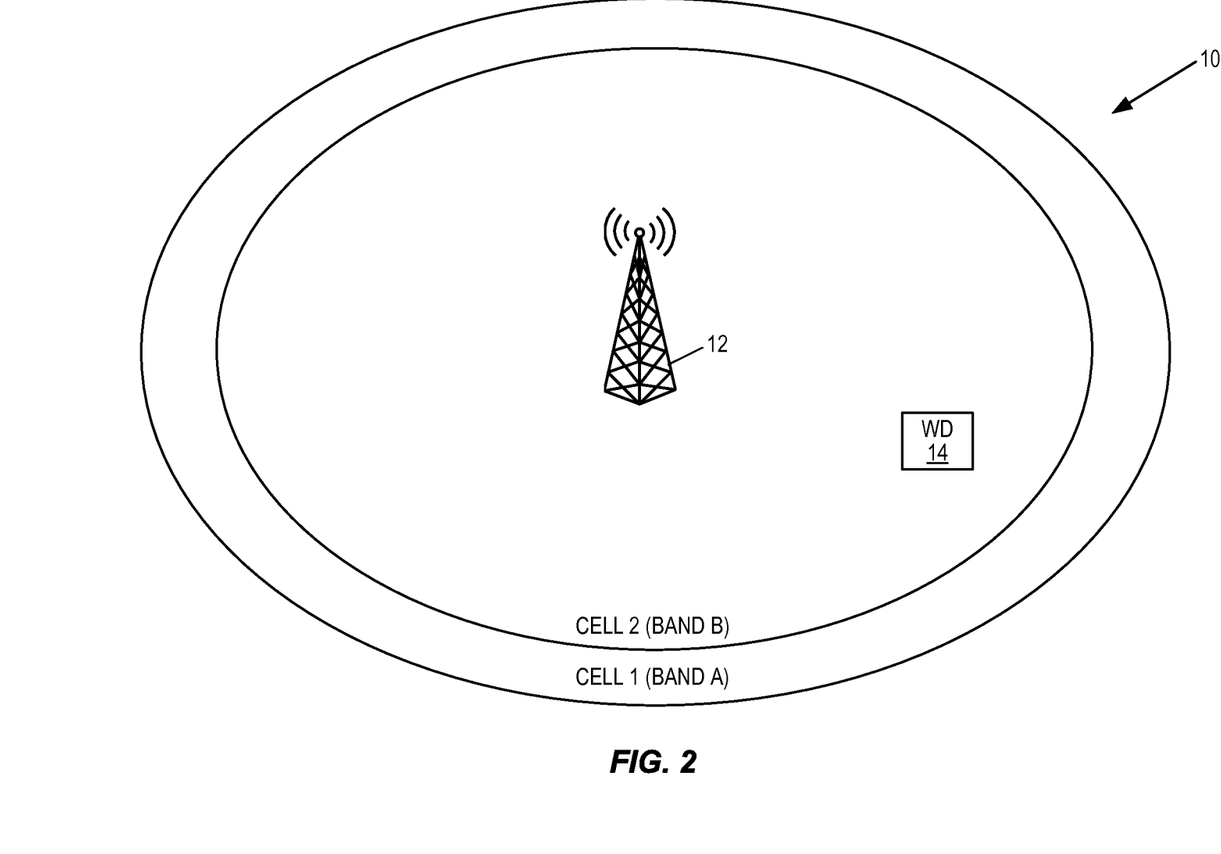
FIG. 2 illustrates a cellular communications network that operates to configure a Secondary Component Carrier (SCC) or Secondary Cell (SCell) of a wireless device in an overlap of a frequency band supported by the cellular communications network and a different frequency band supported by the wireless device according to one embodiment of the present disclosure.

FIG. 2 illustrates a cellular communications network 10, which may also be referred to herein as a wireless network or wireless communication network, that enables configuring a SCC for a wireless device (e.g., a UE) in an overlap between a frequency band supported by the wireless device and a different frequency band supported by the cellular communications network 10. The cellular communications network 10 includes a BS 12. The BS 12 is part of a Radio Access Network (RAN). In some embodiments, the cellular communications network 10 is a 3GPP LTE network, and the RAN is a E-UTRAN. In this example, the BS 12 serves a first cell (Cell 1) using frequency band A and a second cell (Cell 2) using a different frequency band B.

A wireless device 14 (e.g., a UE) connects to Cell 1. Cell 1 is thus a PCell of the wireless device 14. The wireless device 14 supports a frequency band C (not shown) that is not supported by the BS 10 (i.e., is not supported by the cellular communications network 10). The frequency band B and the frequency band C are different frequency bands, but overlap at least partially. The BS 10 then configures a SCC for the wireless device 14 in the overlap of frequency band B and frequency band C. Specifically, in some embodiments, the BS 10 configures the SCC for the wireless device 14 by sending an RRCConnectionReconfiguration message to the wireless device 14, where the RRCConnectionReconfiguration message includes an EARFCN of the frequency band C supported by the wireless device 14. Transmissions (e.g., downlink and/or uplink transmissions) on the SCC are restricted to the overlap between the frequency band B and the frequency band C.

Figure 3A:
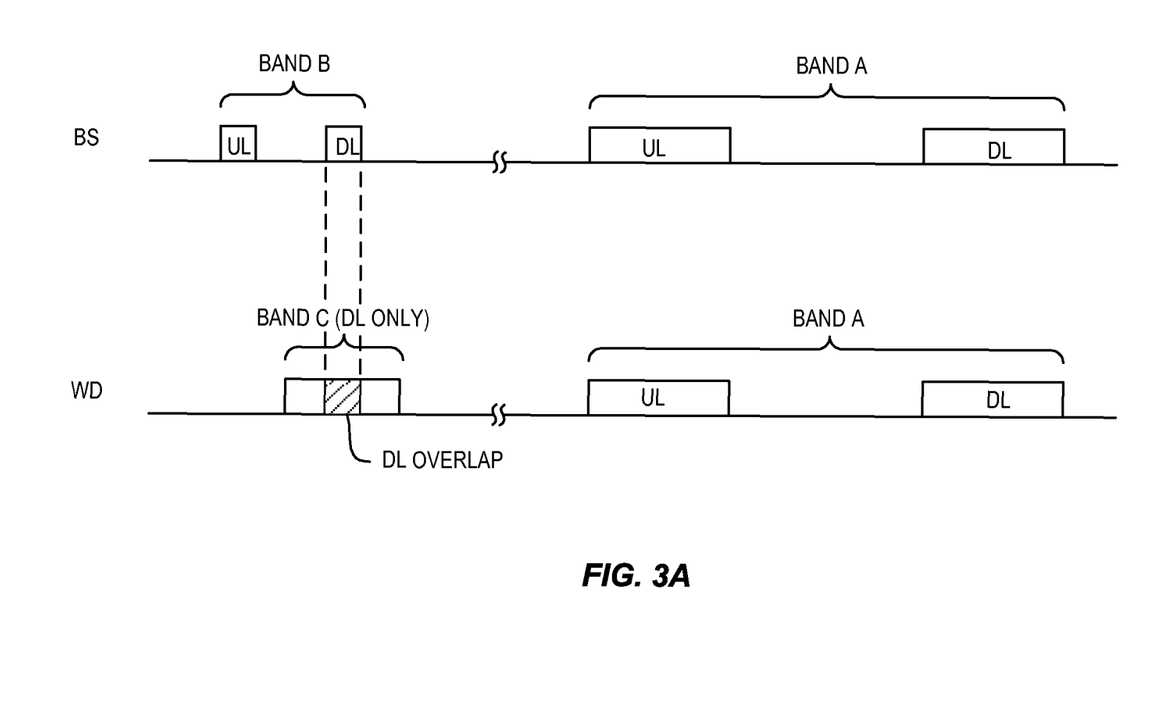
FIGS. 3A through 3C illustrates examples of a frequency band supported by the cellular communications network and a frequency band supported by the wireless device that provide an overlap in which a SCC or SCell is configured for the wireless device according to some embodiments of the present disclosure.
Figure 3B:
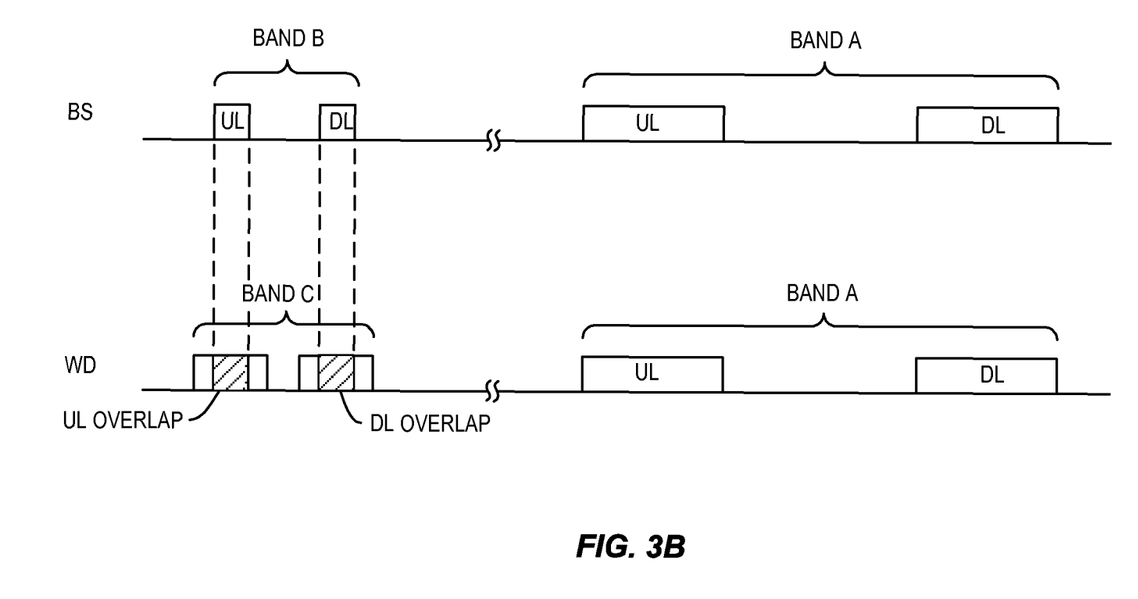
Figure 3C:
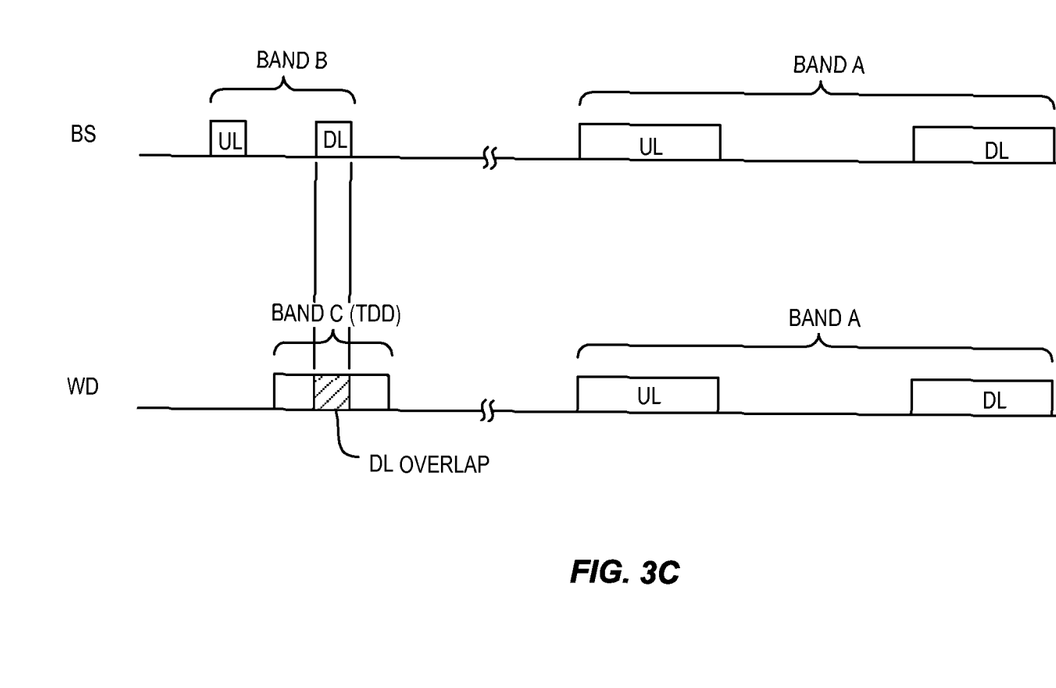

FIGS. 3A through 3C illustrate examples of frequency bands A, B, and C and, in particular, the overlap between frequency bands B and C in which the SCC is configured for the wireless device 14 according to some exemplary embodiments of the present disclosure. FIG. 3A illustrates an example in which frequency bands A and B are FDD frequency bands including corresponding downlink and uplink bands and frequency band C is a downlink-only frequency band. In this example, the PCC of the wireless device 14 is configured in the frequency band A, and the SCC of the wireless device 14 is configured in the overlap between the downlink band of the FDD frequency band B and the downlink-only frequency band C. In this case, the SCC is used for downlink only. Uplink transmissions from the wireless device 14 are made using the PCC in the FDD frequency band A.

FIG. 3B illustrates an example in which frequency bands A, B, and C are all FDD frequency bands including corresponding downlink and uplink bands. In this example, the PCC of the wireless device 14 is configured in the frequency band A, and the SCC of the wireless device 14 is configured in the overlap between the FDD frequency band B and the FDD frequency band C. In this particular example, downlink transmissions on the SCC use the overlap between the downlink bands of the FDD frequency bands B and C, and uplink transmissions on the SCC use the overlap between the uplink bands of the FDD frequency bands B and C. However, in other embodiments, the SCC may be for downlink only, in which case the downlink transmissions on the SCC use the overlap between the downlink bands of the FDD frequency bands B and C.

FIG. 3C illustrates an example in which frequency bands A and B are FDD frequency bands including corresponding downlink and uplink bands and frequency band C is a TDD frequency band. In this example, the PCC of the wireless device 14 is configured in the frequency band A, and the SCC of the wireless device 14 is configured in the overlap between the FDD frequency band B and the TDD frequency band C. In this particular example, downlink transmissions on the SCC use the overlap between the downlink band of the FDD frequency band B and the TDD frequency band C. In this case, only downlink transmissions occur on the SCC. In particular, the downlink transmissions on the SCC occur in the overlap between the FDD frequency band B and the TDD frequency band C using only the downlink resources of the TDD frequency band. Note, however, that in some embodiments, uplink transmissions may also be allowed in the overlap. Note that while FIG. 3C illustrates the TDD frequency band as the frequency band supported by the wireless device 14, in another embodiment, frequency band B is a TDD frequency band and frequency band C is a FDD frequency band.

Figure 4:
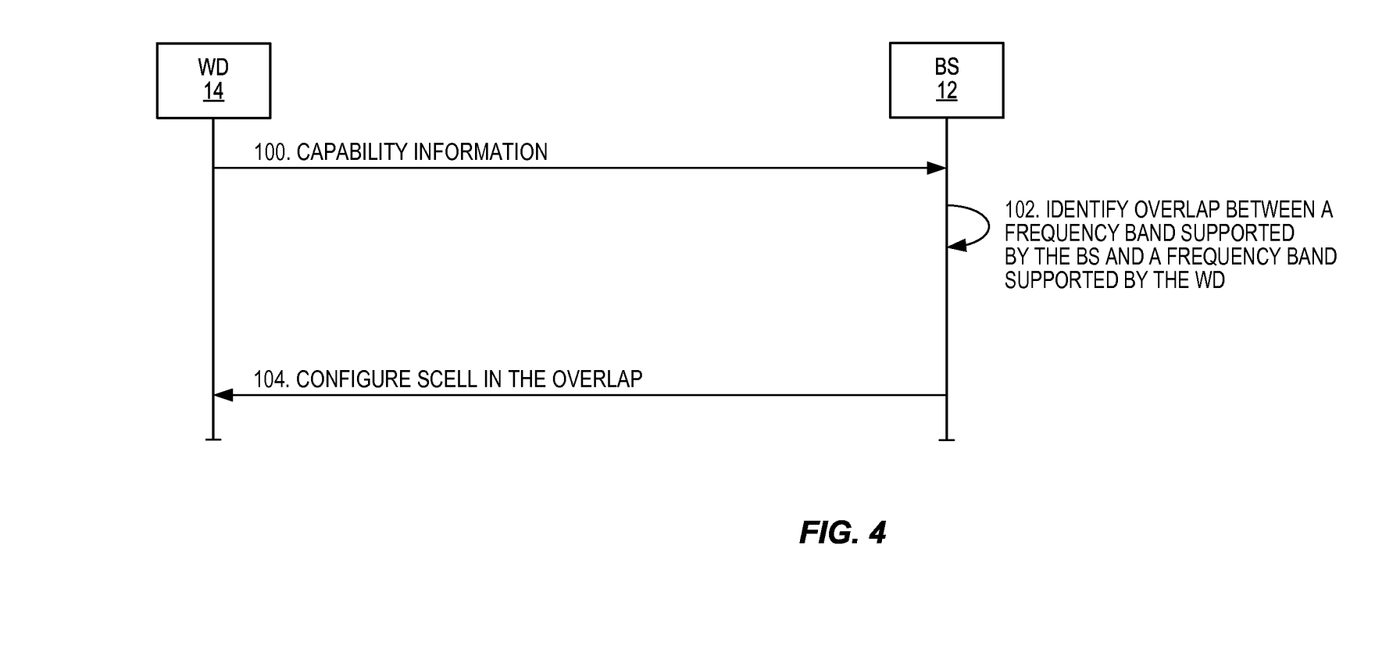
FIG. 4 illustrates the operation of the Base Station (BS) and the wireless device of FIG. 2 to provide configuration of a SCC or SCell of the wireless device in an overlap between different frequency bands supported by the cellular communications network and the wireless device according to one embodiment of the present disclosure.

FIG. 4 illustrates the operation of the BS 12 and the wireless device 14 of FIG. 2 according to one embodiment of the present disclosure. As discussed above, once the PCC of the wireless device 14 is configured, capabilities of the wireless device 14 are obtained by the BS 12. In this embodiment, capability information that indicates the capabilities of the wireless device 14 is provided from the wireless device 14 to the BS 12 (step 100). However, in another embodiment, the BS 12 may obtain the capability information for the wireless device 14 from another network node, e.g., a MME. The capabilities of the wireless device 14 include the frequency bands supported by the wireless device 14. The band combinations supported by the wireless device 14 may then be determined as the combinations of the frequency bands supported by the wireless device 14. Alternatively, the band combinations supported by the wireless device 14 may be directly indicated (e.g., listed) in the capability information for the wireless device 14.

The BS 12 identifies an overlap between a frequency band supported by the BS 12 (referred to as frequency band B above) and a frequency band supported by the wireless device 14 (referred to as frequency band C above) (step 102). More specifically, the BS 12 knows the frequency bands supported by the BS 12 and thus the frequency bands supported by the cellular communications network 10. From the capability information, the BS 12 also knows the frequency bands supported by the wireless device 14. The BS 12 can then use this knowledge to identify the frequency bands (frequency bands B and C) that overlap, at least partially.

The BS 12 then configures an SCell, or SCC, for the wireless device 14 in the overlap between the frequency band supported by the BS 12 (frequency band B) and the frequency band supported by the wireless device 14 (frequency band C) (step 104). More specifically, in one embodiment, the BS 12 sends an RRCConnectionReconfiguration message to the wireless device 14 including the EARFCN of the frequency band supported by the wireless device 14 (frequency band C) that overlaps the frequency band supported by the BS 12 (frequency band B). At this point, the SCell, or SCC, is configured for the wireless device 14. The BS 12 can then transmit, and the wireless device 14 can then receive, downlink transmissions on the SCC using the overlap between the two frequency bands. Further, in some embodiments, uplink transmissions may also be made on the SCC or limited to only the PCC.

Figure 5:
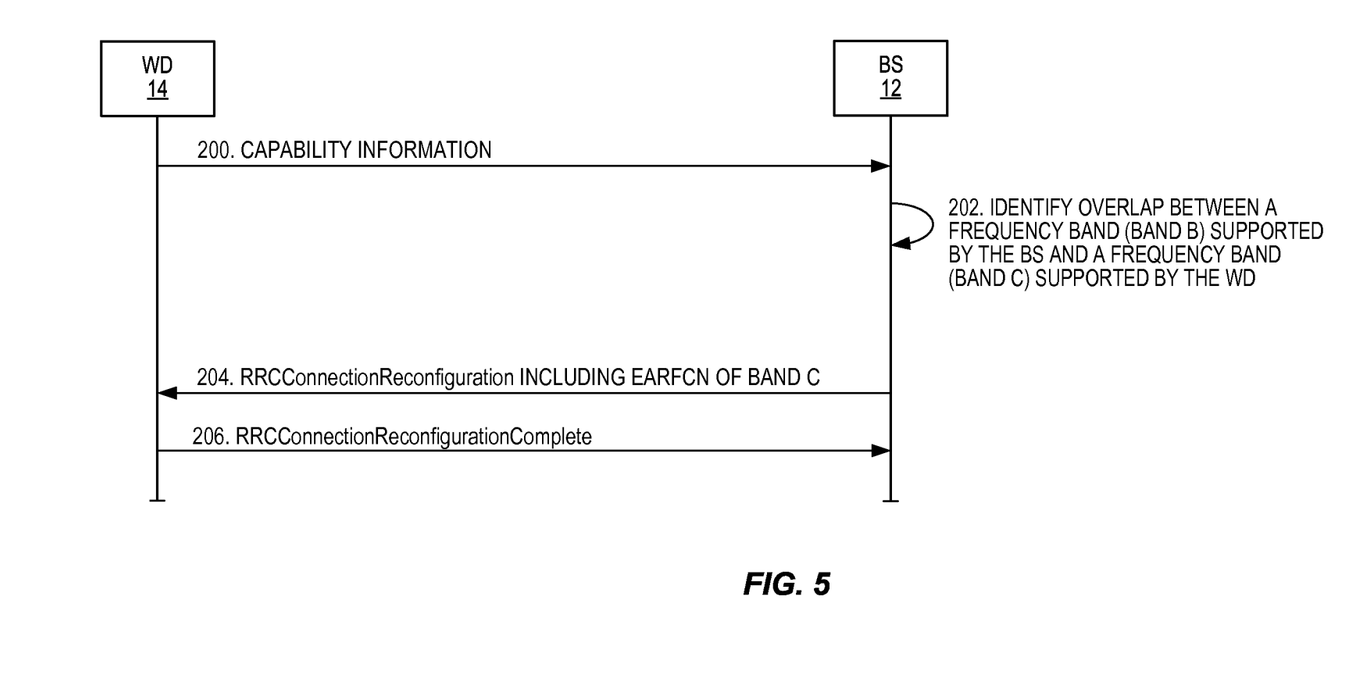
FIG. 5 illustrates the operation of the BS and the wireless device of FIG. 2 to provide configuration of a SCC or SCell of the wireless device in an overlap between different frequency bands supported by the cellular communications network and the wireless device according to another embodiment of the present disclosure.

FIG. 5 illustrates the operation of the BS 12 and the wireless device 14 of FIG. 2 according to another embodiment of the present disclosure. This embodiment is similar to that of FIG. 4 but where the configuration of the SCell, and thus the SCC, is configured via an RRCConnectionReconfiguration message. As discussed above, once the PCC of the wireless device 14 is configured, capabilities of the wireless device 14 are obtained by the BS 12. In this embodiment, capability information that indicates the capabilities of the wireless device 14 is provided from the wireless device 14 to the BS 12 (step 200). However, in another embodiment, the BS 12 may obtain the capability information for the wireless device 14 from another network node, e.g., a MME. The capabilities of the wireless device 14 include the frequency bands supported by the wireless device 14. The band combinations supported by the wireless device 14 may then be determined as the combinations of the frequency bands supported by the wireless device 14. Alternatively, the band combinations supported by the wireless device 14 may be directly indicated (e.g., listed) in the capability information for the wireless device 14.

The BS 12 identifies an overlap between a frequency band supported by the BS 12 (referred to as frequency band B above) and a frequency band supported by the wireless device 14 (referred to as frequency band C above) (step 202). The BS 12 then sends an RRCConnectionReconfiguration message to the wireless device 14 including the EARFCN of the frequency band supported by the wireless device 14 (frequency band C) that overlaps the frequency band supported by the BS 12 (frequency band B) (step 204). The wireless device 14 responds with an RRCConnectionReconfigurationComplete message (step 206). At this point, the SCell, or SCC, is configured for the wireless device 14. The BS 12 can then transmit, and the wireless device 14 can then receive, downlink transmissions on the SCC using the overlap between the two frequency bands. Further, in some embodiments, uplink transmissions may also be made on the SCC or limited to only the PCC.

Figure 6:
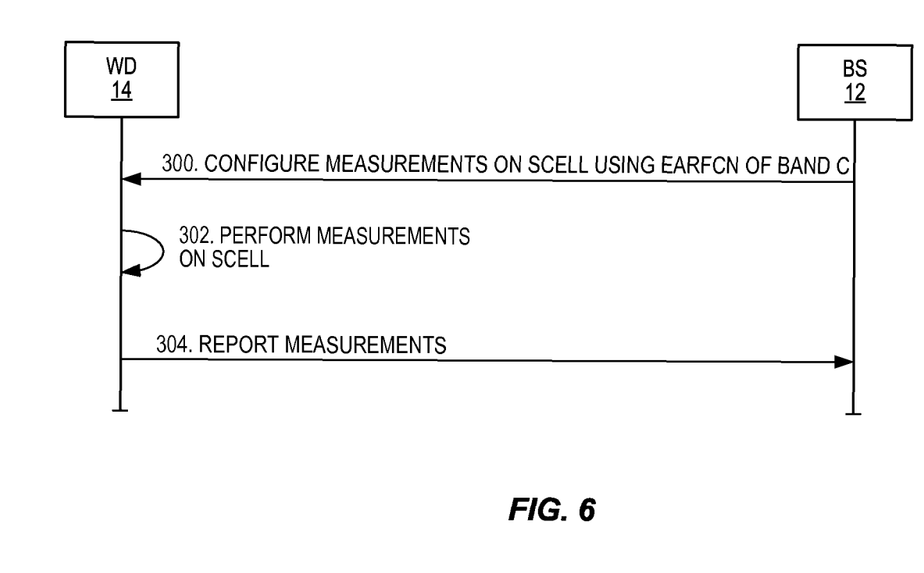
FIG. 6 illustrates the operation of the BS and the wireless device of FIG. 2 to configure and provide wireless device measurements for a SCC or SCell of the wireless device configured in an overlap between different frequency bands supported by the cellular communications network and the wireless device according to one embodiment of the present disclosure.

In some embodiments, the cellular communications network 10 configures wireless device measurements (which may be referred to as UE measurements) on the SCC configured according to the embodiments described above. In this regard, FIG. 6 illustrates the operation of the BS 12 and the wireless device 14 to configure, perform, and report measurements on a SCC configured in the overlap between a frequency band supported by the cellular communications network 10 and a frequency band supported by the wireless device 14 according to one embodiment of the present disclosure. As illustrated, the BS 12 configures measurements on the SCC, or in other words the SCell, using the EARFCN of the frequency band (frequency band C) supported by the wireless device 14 that overlaps the frequency band (frequency band B) supported by the cellular communications network 10/BS 12 (step 300). Again, the SCC is configured in the overlap between frequency bands B and C. The wireless device 14 then performs measurements on the SCell, or in other words on the SCC, as configured by the BS 12 (step 302). The measurements may be any type of wireless device measurements such as, for example, Reference Signal Received Power (RSRP), Reference Signal Received Quality (RSRQ), Channel Quality Indication (CQI), or the like. The wireless device 14 then reports the measurements to the BS 12 in the conventional manner (step 304).

Figure 7:
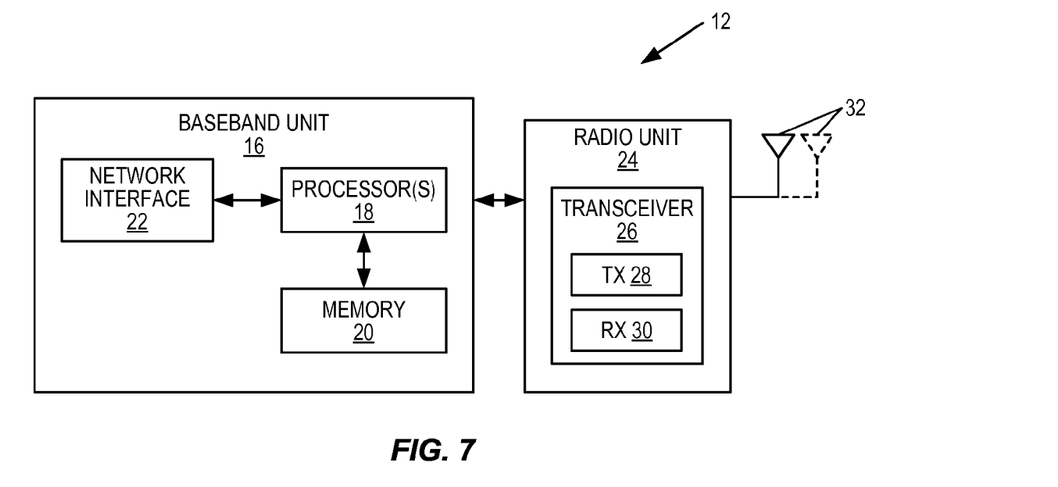
FIG. 7 is a block diagram of the BS of FIG. 2 according to one embodiment of the present disclosure.

FIG. 7 is a block diagram of the BS 12 of FIG. 2 according to one embodiment of the present disclosure. As illustrated, the BS 12 includes a baseband unit 16 including at least one processor 18 (e.g., a Central Processing Unit (CPU), Application Specific Integrated Circuit (ASIC), Field-Programmable Gate Array (FPGA), etc.), memory 20, and a network interface 22 as well as a radio unit 24 including a wireless, or radio frequency (RF), transceiver 26 that includes a transmitter 28 and a receiver 30 coupled to one or more antennas 32. In some embodiments, the functionality of the BS 12 described herein is implemented in software that is stored in the memory 20 and executed by the at least one processor 18, whereby the BS 12 operates to, e.g., configure a SCC for the wireless device 14 in an overlap between a frequency band supported by the BS 12 (and not supported by the wireless device 14) and a different frequency band supported by the wireless device 14 (and not supported by the BS 12).

In some embodiments, a computer program is provided, where the computer program comprises instructions which, when executed on at least one processor (e.g., the at least one processor 18), cause the at least one processor to carry out the functionality of the BS 12 according to any of the embodiments described herein. In some embodiments, a carrier containing the computer program is provided, wherein the carrier is one of an electronic signal, an optical signal, a radio signal, or a computer readable storage medium (e.g., a non-transitory computer readable medium).

Figure 8:
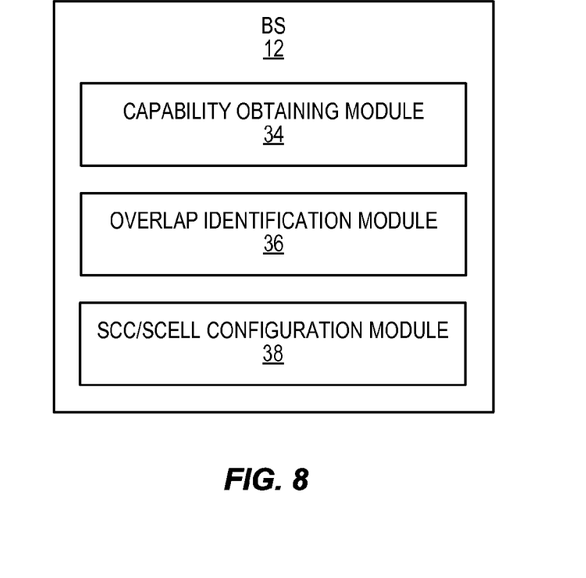
FIG. 8 is a block diagram of the BS of FIG. 2 according to another embodiment of the present disclosure.

FIG. 8 illustrates the BS 12 according to another embodiment of the present disclosure. In this embodiment, the BS 12 includes a capability obtaining module 34, an overlap identification module 36, and a SCC configuration module 38, each of which is implemented in software. The capability obtaining module 34 obtains the capability information for the wireless device 14, as described above. The overlap identification module 36 then identifies an overlap between the frequency band (frequency band B) supported by the BS 12 and the frequency band (frequency band C) supported by the wireless device 14. The SCC configuration module 38 then configures the SCC for the wireless device 14 in the overlap. More specifically, in one embodiment, the SCC configuration module 38 sends, via a wireless transceiver of the BS 12, a RRCConnectionReconfiguration message including an EARFCN of the frequency band (frequency band C) supported by the wireless device 14 that has the overlap with the frequency band (frequency band B) supported by the BS 12.

Figure 9:
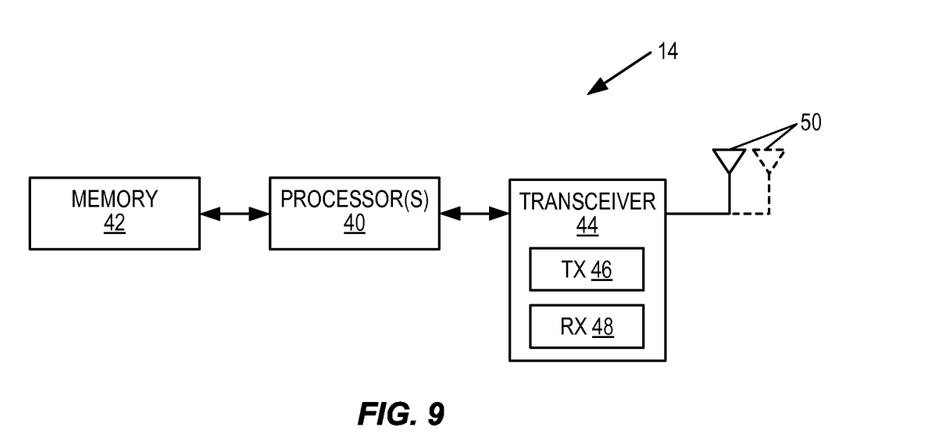
FIG. 9 is a block diagram of the wireless device of FIG. 2 according to one embodiment of the present disclosure.

FIG. 9 is a block diagram of the wireless device 14 of FIG. 2 according to one embodiment of the present disclosure. As illustrated, the wireless device 14 includes at least one processor 40, memory 42, and a wireless, or RF, transceiver 44 that includes a transmitter 46 and a receiver 48 coupled to one or more antennas 50. In some embodiments, the functionality of the wireless device 14 described herein is implemented in software that is stored in the memory 42 and executed by the at least one processor 40.

In some embodiments, a computer program is provided, where the computer program comprises instructions which, when executed on at least one processor (e.g., the at least one processor 40), cause the at least one processor to carry out the functionality of the wireless device 14 according to any of the embodiments described herein. In some embodiments, a carrier containing the computer program is provided, wherein the carrier is one of an electronic signal, an optical signal, a radio signal, or a computer readable storage medium (e.g., a non-transitory computer readable medium).

Figure 10:
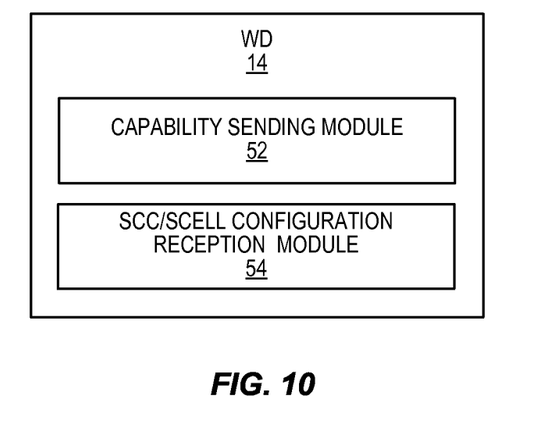
FIG. 10 is a block diagram of the wireless device of FIG. 2 according to another embodiment of the present disclosure.

FIG. 10 illustrates the wireless device 14 according to another embodiment of the present disclosure. In this embodiment, the wireless device 14 includes a capability sending module 52 (in some embodiments) and a SCC configuration reception module 54, each of which is implemented in software. The capability sending module 52 operates to send, via a wireless transceiver of the wireless device 14, capability information of the wireless device 14 to the BS 12. The SCC configuration reception module 54 operates to receive, via the wireless transceiver of the wireless device 14, the SCC configuration for the wireless device 14.

The following acronyms are used throughout this disclosure.

3GPP 3$^{rd}$ Generation Partnership Project
ASIC Application Specific Integrated Circuit
BS Base Station
CPU Central Processing Unit
CQI Channel Quality Indication
EARFCN Evolved Universal Terrestrial Radio Access Absolute Radio Frequency Channel Number
E-UTRA Evolved Universal Terrestrial Radio Access
E-UTRAN Evolved Universal Terrestrial Radio Access Network
FBI Frequency Band Indicator
FDD Frequency Division Duplex
FPGA Field-Programmable Gate Array
Hz Hertz
LTE Long Term Evolution
MHz Megahertz
MME Mobility Management Entity
PCC Primary Component Carrier
PCell Primary Cell
RAN Radio Access Network
RF Radio Frequency
RSRP Reference Signal Received Power
RSRQ Reference Signal Received Quality
SCC Secondary Component Carrier
SCell Secondary Cell
TDD Time Division Duplex
UE User Equipment
UMTS Universal Mobile Telecommunications System Those skilled in the art will recognize improvements and modifications to the embodiments of the present disclosure. All such improvements and modifications are considered within the scope of the concepts disclosed herein and the claims that follow.

What is claimed is:

1. A method of configuring a secondary component carrier for a wireless device in a cellular communications network enabling carrier aggregation, comprising:
obtaining capabilities of the wireless device, the capabilities indicating a frequency band combination supported by the wireless device where the frequency band combination includes a first frequency band supported by a base station and the wireless device that is used for a primary cell of the wireless device and a second frequency band supported by the wireless device but not supported by the base station;
identifying an overlap between the second frequency band supported by the wireless device but not supported by the base station and a third frequency band supported by the base station but not supported by the wireless device; and
configuring the secondary component carrier for the wireless device in the overlap between the second frequency band supported by the wireless device but not supported by the base station and the third frequency band supported by the base station but not supported by the wireless device,
wherein configuring the secondary component carrier in the overlap comprises indicating, to the wireless device, an Evolved Universal Terrestrial Radio Access, E-UTRA, Absolute Radio Frequency Channel Number, EARFCN, of the second frequency band supported by the wireless device but not supported by the base station, and
wherein the second frequency band supported by the wireless device but not supported by the base station is a downlink only frequency band, and the third frequency band supported by the base station but not supported by the wireless device is a Frequency Division Duplexing, FDD, frequency band.

2. The method of claim 1 wherein the secondary component carrier is for downlink only.

3. The method of claim 1 wherein the second frequency band supported by the wireless device but not supported by the base station is a first Frequency Division Duplexing, FDD, frequency band, and the third frequency band supported by the base station but not supported by the wireless device is a second FDD frequency band.

4. The method of claim 3 wherein the secondary component carrier is for downlink only.

5. The method of claim 3 wherein the secondary component carrier is for both downlink and uplink.

6. The method of claim 3 wherein the wireless device does not support MultiBandlnfoList.

7. A method of configuring a secondary component carrier for a wireless device in a cellular communications network enabling carrier aggregation, comprising:
obtaining capabilities of the wireless device, the capabilities indicating a frequency band combination supported by the wireless device where the frequency band combination includes a first frequency band supported by a base station and the wireless device that is used for a primary cell of the wireless device and a second frequency band supported by the wireless device but not supported by the base station;
identifying an overlap between the second frequency band supported by the wireless device but not supported by the base station and a third frequency band supported by the base station but not supported by the wireless device; and
configuring the secondary component carrier for the wireless device in the overlap between the second frequency band supported by the wireless device but not supported by the base station and the third frequency band supported by the base station but not supported by the wireless device,
wherein configuring the secondary component carrier in the overlap comprises indicating, to the wireless device, an Evolved Universal Terrestrial Radio Access, E-UTRA, Absolute Radio Frequency Channel Number, EARFCN, of the second frequency band supported by the wireless device but not supported by the base station, and
wherein the second frequency band supported by the wireless device but not supported by the base station is a Frequency Division Duplexing, FDD, frequency band, and the third frequency band supported by the base station but not supported by the wireless device is a Time Division Duplexing, TDD, frequency band.

8. The method of claim 7 wherein the secondary component carrier is for downlink only.

9. A method of configuring a secondary component carrier for a wireless device in a cellular communications network enabling carrier aggregation, comprising:
obtaining capabilities of the wireless device, the capabilities indicating a frequency band combination supported by the wireless device where the frequency band combination includes a first frequency band supported by a base station and the wireless device that is used for a primary cell of the wireless device and a second frequency band supported by the wireless device but not supported by the base station;
identifying an overlap between the second frequency band supported by the wireless device but not supported by the base station and a third frequency band supported by the base station but not supported by the wireless device; and
configuring the secondary component carrier for the wireless device in the overlap between the second frequency band supported by the wireless device but not supported by the base station and the third frequency band supported by the base station but not supported by the wireless device,
wherein configuring the secondary component carrier in the overlap comprises indicating, to the wireless device, an Evolved Universal Terrestrial Radio Access, E-UTRA, Absolute Radio Frequency Channel Number, EARFCN, of the second frequency band supported by the wireless device but not supported by the base station, and
wherein the second frequency band supported by the wireless device but not supported by the base station is a Time Division Duplexing, TDD, frequency band, and the third frequency band supported by the base station but not supported by the wireless device is a Frequency Division Duplexing, FDD, frequency band.

10. The method of claim 9 wherein the secondary component carrier is for downlink only.

11. A base station enabled to configure a secondary component carrier for a wireless device in a cellular communications network enabling carrier aggregation, comprising:
a wireless transceiver;
at least one processor; and
memory containing instructions executable by the at least one processor, whereby the base station is configured to:
obtain capabilities of the wireless device, the capabilities indicating a frequency band combination supported by the wireless device where the frequency band combination includes a first frequency band supported by a base station and the wireless device that is used for a primary cell of the wireless device and a second frequency band supported by the wireless device but not supported by the base station;
identify an overlap between the second frequency band supported by the wireless device but not supported by the base station and a third frequency band supported by the base station but not supported by the wireless device; and
configure the secondary component carrier for the wireless device in the overlap between the second frequency band supported by the wireless device but not supported by the base station and the third frequency band supported by the base station but not supported by the wireless device,
wherein, in order to configure the secondary component carrier in the overlap, the base station is operative to indicate, to the wireless device, an Evolved Universal Terrestrial Radio Access, E-UTRA, Absolute Radio Frequency Channel Number, EARFCN, of the second frequency band supported by the wireless device but not supported by the base station, and wherein the second frequency band supported by the wireless device but not supported by the base station is a downlink only frequency band, and the third frequency band supported by the base station but not supported by the wireless device is a Frequency Division Duplexing, FDD, frequency band.

12. The base station of claim 11 wherein the secondary component carrier is for downlink only.

13. The base station of claim 11 wherein the second frequency band supported by the wireless device but not supported by the base station is a first Frequency Division Duplexing, FDD, frequency band, and the third frequency band supported by the base station but not supported by the wireless device is a second FDD frequency band.

14. The base station of claim 13 wherein the secondary component carrier is for downlink only.

15. The base station of claim 13 wherein the secondary component carrier is for both downlink and uplink.

16. The base station of claim 13 wherein the wireless device does not support MultiBandlnfoList.

17. A base station enabled to configure a secondary component carrier for a wireless device in a cellular communications network enabling carrier aggregation, comprising:

a wireless transceiver;

at least one processor; and memory containing instructions executable by the at least one processor, whereby the base station is configured to:

obtain capabilities of the wireless device, the capabilities indicating a frequency band combination supported by the wireless device where the frequency band combination includes a first frequency band supported by a base station and the wireless device that is used for a primary cell of the wireless device and a second frequency band supported by the wireless device but not supported by the base station;

identify an overlap between the second frequency band supported by the wireless device but not supported by the base station and a third frequency band supported by the base station but not supported by the wireless device; and configure the secondary component carrier for the wireless device in the overlap between the second frequency band supported by the wireless device but not supported by the base station and the third frequency band supported by the base station but not supported by the wireless device, wherein, in order to configure the secondary component carrier in the overlap, the base station is operative to indicate, to the wireless device, an Evolved Universal Terrestrial Radio Access, E-UTRA, Absolute Radio Frequency Channel Number, EARFCN, of the second frequency band supported by the wireless device but not supported by the base station, and wherein the second frequency band supported by the wireless device but not supported by the base station is a Frequency Division Duplexing, FDD, frequency band, and the third frequency band supported by the base station but not supported by the wireless device is a Time Division Duplexing, TDD, frequency band.

18. The base station of claim 17 wherein the secondary component carrier is for downlink only.

19. A base station enabled to configure a secondary component carrier for a wireless device in a cellular communications network enabling carrier aggregation, comprising:

a wireless transceiver;

at least one processor; and memory containing instructions executable by the at least one processor, whereby the base station is configured to:

obtain capabilities of the wireless device, the capabilities indicating a frequency band combination supported by the wireless device where the frequency band combination includes a first frequency band supported by a base station and the wireless device that is used for a primary cell of the wireless device and a second frequency band supported by the wireless device but not supported by the base station;

identify an overlap between the second frequency band supported by the wireless device but not supported by the base station and a third frequency band supported by the base station but not supported by the wireless device; and configure the secondary component carrier for the wireless device in the overlap between the second frequency band supported by the wireless device but not supported by the base station and the third frequency band supported by the base station but not supported by the wireless device, wherein, in order to configure the secondary component carrier in the overlap, the base station is operative to indicate, to the wireless device, an Evolved Universal Terrestrial Radio Access, E-UTRA, Absolute Radio Frequency Channel Number, EARFCN, of the second frequency band supported by the wireless device but not supported by the base station, and wherein the second frequency band supported by the wireless device but not supported by the base station is a Time Division Duplexing, TDD, frequency band, and the third frequency band supported by the base station but not supported by the wireless device is a Frequency Division Duplexing, FDD, frequency band.

20. The base station of claim 19 wherein the secondary component carrier is for downlink only.

* * * * *